United States Patent Office 3,530,187
Patented Sept. 22, 1970

3,530,187
PREPARATION OF N-(ALKADIENYL)AMINES
Thomas M. Shryne, Walnut Creek, Calif., assignor to Shell Oil Company, New York, N.Y., a corporation of Delaware
No Drawing. Filed Dec. 26, 1967, Ser. No. 693,159
Int. Cl. C07c 43/14, 43/20, 85/00
U.S. Cl. 260—583
7 Claims

ABSTRACT OF THE DISCLOSURE

Aromatic 2,7-alkadienyl ethers, aliphatic 2,7-alkadienyl ethers and N-(2,7-alkadienyl)amines are produced by a dimerization-addition reaction of phenols, alcohols, or organic amines, in which there is present at least one N-hydrogen substituent, with conjugated alkadienes, e.g., butadiene, in the presence of palladium or platinum complexed with tertiary phosphine ligands. The unsaturated ethers are useful for conversion to epoxides and the amines are useful for conversion to detergents and herbicides.

BACKGROUND OF THE INVENTION

In U.S. Pat. 3,350,451, issued Oct. 31, 1967, to E. J. Smutny, and in copending applications of E. J. Smutny, U.S. Ser. Nos. 681,029, filed Nov. 6, 1967, and 663,559, filed Aug. 28, 1967, diene dimer derivatives wherein diene moieties have dimerized in a linear manner concomitant with addition of amino- or hydroxy-containing reagents to produce amines or ethers have been obtained utilizing palladium-, platinum-, or ruthenium-containing catalyst and a phenoxide anion catalyst promoter. Although the metal-containing compound alone may serve as a catalyst therein, the activity of the metal compound is greatly enhanced by the presence within the reaction system of a phenoxide anion catalyst promoter and the disclosed preferred metal-containing catalyst, palladium chloride, used alone does not produce the amines or ethers in sufficient yield to effect a feasibly practical preparative route therefor.

SUMMARY OF THE INVENTION

Therefore, it was surprising to find that aromatic 2,7-alkadienyl ethers, aliphatic 2,7-alkadienyl ethers and N-(2,7-alkadienyl)amines are produced in effective yield by reacting phenols, alcohols or organic amines, wherein there is present at least one N-hydrogen substituent, with conjugated alkadienes in the presence of palladium or platinum complexed with tertiary phosphine ligands as catalyst and in the absence of phenoxide anion catalyst promoter. Whereas before, in the processes of U.S. 3,350,451 and U.S. Ser. Nos. 681,029 and 663,559 with palladium or platinum halide as catalyst, it was necessary to modify the catalyst with phenoxide anion catalyst promoter, now in the process of the present invention, when palladium or platinum complexed with tertiary phosphine, e.g., tetrakis(triphenylphosphine)palladium, is used instead of palladium or platinum halide, phenoxide anion as broadly defined in U.S. 3,350,451 and U.S. Ser. Nos. 681,029 and 663,559 is not required. In the present invention the process is carried out in a system essentially free from phenoxide anions and in this manner has advanced the art beyond the processes of U.S. 3,350,451 and U.S. Ser. Nos. 681,029 and 663,559. In general, the process of the present invention is carried out free of organic ions, e.g., phenoxide anions. Although the mechanism of the condensation process is not completely understood, the process of the invention results in the efficient production of ethers, one moiety of which is derived from the phenol or alcohol reactant and the other moiety of which may be considered as derived from a dimer of the diene reactant, and of amines wherein the organic amine product has a nitrogen substituent a moiety which may be considered as derived from a dimer of the diene reactant. By way of illustration, from the reaction of phenol and butadiene in the process of the invention is obtained from 1-phenoxy-2,7-octadiene, from the reaction of methanol and butadiene is obtained 1-methoxy-2,7-octadiene, and from the reaction of piperidine and butadiene is obtained N-(2,7-octadienyl)piperidine.

DESCRIPTION OF PREFERRED EMBODIMENTS

The conjugated diene employed as a reactant in the process of the invention is an α, ω-conjugated alkadiene having only hydrogen substituents on the terminal carbon atoms of a four-carbon chain. Dienes with nonhydrogen substituents on the internal, i.e. nonterminal, carbon atoms are suitably employed, provided that the internal-carbon substituents do not unduly sterically hinder the diene dimerization. A preferred class of diene reactants comprises vicinal dimethylidenealkane of from 4 to 6 carbon atoms or, described alternatively, butadiene having from 0 to 2 internal-carbon methyl substituents. These diene compounds are butadiene, isoprene and 2,3 - dimethylbutadiene. Of these, butadiene is particularly preferred.

The process of the present invention is broadly applicable, with respect to the aromatic ether, products, to a wide variety of compounds incorporating within their structure at least one phenolic hydroxyl group and the process is suitably employed with phenols of complex or of comparatively simple structure. Best results are obtained when phenols of comparatively simple structure are employed such as when the phenol reactant comprises a mono- to dinuclear aromatic compound possessing at least one hydroxyl substituent on at least one six-membered carbocyclic aromatic ring and having from 6 to 24 carbon atoms. The phenol reactant is the same as that described in the abovementioned copending U.S. application Ser. No. 681,029, filed Nov. 6, 1967. The pertinent portions of Ser. No. 681,029 are incorporated in and made a part of this specification for the purpose of describing the phenol reactant in more detail, although further detail in that respect will be obvious to those familiar with the art.

The process of the invention is broadly applicable, with respect to the aliphatic ether products, to a wide variety of compounds incorporating within their structure at least one alcoholic hydroxy group, that is, a hydroxyl group attached to an aliphatic carbon atom, and the process is suitably employed with monohydric or polyhydric alcohols of complex or comparatively simple structure. Best results are obtained when an alcohol of comparatively simple structure is employed wherein there is at least one alcoholic hydroxyl group that is bonded to a carbon atom which is a member of no more than two carbon-carbon bonds, i.e., wherein there is a primary or secondary alcoholic hydroxy group. The alcohol reactant is the same as that described in the above-mentioned copending U.S. application Ser. No. 663,559, filed Aug. 28, 1967. The pertinent portions of Ser. No. 663,559 are incorporated in and made a part of this specification as needed for the purpose of describing the alcohol reactant in more detail.

The optimum ratio of phenol or alcohol reactant to conjugated diene will depend in part upon the functionality of the reactant, that is the number of hydroxyl groups present in the phenol or alcohol reactant molecule, as well as the extent of reactant conversion that is desired. Ratios of moles of diene to moles of hydroxyl group as low as about 1:4 are suitable. However, to obtain higher conversions, a more substantial proportion of diene is preferred and ratios of moles of diene to moles of phenolic or alcoholic hydroxyl groups from about 1:1 to about 6:1 are more satisfactory, with best results being obtained when ratios of moles of diene to moles of hydroxyl group from about 1.5:1 to about 4.5:1 are utilized.

In the process of the invention with respect to the amine products, the conjugated diene is contacted with an organic amine having within the molecular structure thereof at least one amino moiety, i.e., a trivalent nitrogen atom wherein from 1 to 2 of the nitrogen substituent(s) is (are) hydrogen and the remaining nitrogen valences are bonded to substituent group(s) through a bond to a carbon atom. The process of the invention is broadly applicable to a wide variety of organic amines of complex or comparatively simple structure which have at least one N-mono- to N,N-dihydro-nitrogen moiety within the molecular structure. Best results, however, are obtained when the organic amine reactant employed in the process is of comparatively simple structure such as when the organic amine is one of up to 20 carbon atoms and is a monoamino compound. The organic amine reactant is the same as that described in the above-mentioned U.S. 3,350,451. The pertinent portions of U.S. 3,350,451 are incorporated in and made part of this specification as needed for the purpose of describing the organic amine reactant in more detail.

The optimum ratio of amine reactant to conjugated diene will depend in part upon the functionality of the amine reactant, that is, the number of nontertiary amino groups present in the amine reactant molecule, and the extent of conversion that is employed. Ratios of moles of conjugated diene reactant to moles of nontertiary amino group as low as about 1:10 are suitable if only a low conversion of the amine is employed. However, to obtain higher conversions, a more substantial proportion of diene is preferred and molar ratios of conjugated diene to nontertiary amino group from about 1:4 to about 10:1 are more satisfactory. Best results are obtained when the molar ratio of diene to nontertiary amino group is from about 1:1 to about 6:1. It should be understood that it is within the contemplated scope of the invention to react, on occasion, only a portion of the nontertiary amino groups present in the amine reactant molecule. For example, in the case of a diamine, reaction takes place at both amine sites, or alternatively it is contemplated to effect reaition at only one amine group. The restrictive amine formation of the latter illustration is favored by molar reactant ratios comparatively high in the amine reactant.

The catalyst composition employed in the process of the invention is a metal complexed with certain tertiary phosphine ligands. The metal is a Group VIII C metal of atomic number from 46 to 78 inclusive, i.e., the metal is palladium or platinum. Most preferred is a complex of palladium. The metals are complexed with ligands of the formula $$R_3P$$

wherein R independently is an organo group having from 1 to 20 carbon atoms, preferably 1 to 10 (two of the R's may be joined to give a heterocyclic ring with the phosphorus atom), and having only aromatic unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, or is substituted hydrocarbyl containing, besides atoms of carbon and hydrogen, other atoms such as oxygen, sulfur, nitrogen and halogen, particularly halogen of atomic number from 9 to 17, which atoms are present in functional groups such as alkoxy, carboalkoxy, acyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N-N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, o-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trifluoromethyl)phenyl and 3-dibutylaminophenyl.

In the $R_3P$ ligand as defined above, the R moieties are the same or are different, although ligands wherein all R groups are the same are generally preferred. Exemplary R groups include phosphines such as triethylphosphine, tributylphosphine, triphenylphosphine, tris(4-methoxyphenyl)phosphine, tris(4-tolyl)phosphine, tris(3-chlorophenyl)phosphine, tris(4 - dimethylaminophenyl) phosphine, diphenylhexylphosphine, dimethyl(3-methoxyphenyl)phosphine, dibutylstearylphosphine, tribenzylphosphine, cyclohexyldibutylphosphine, and the like. In general, phosphine ligands wherein the phosphorus substituents are aromatic are generally preferred over wholly aliphatic phosphine ligands. Largely because of economic reasons, triphenylphosphine is a particularly preferred ligand.

Without wishing to be bound by any particular theory, it appears that the chemical transformations during the course of the reaction which involve the catalyst are quite complex, probably involving the formation and destruction of complexes between the metal moiety and the reactants, so that no one formula suitably describes the actual catalytic species. In one modification of the process of the invention, catalyst is introduced or produced in situ in a form represented by the formula $$L_nM$$

wherein L is the ligand $R_3P$ defined hereinabove, M is palladium or platinum and $n$ is an integer from 3 to 4 inclusive. Thus, catalyst is introduced or produced in situ in the form of a tris(tert-phosphine)-platinum, tetrakis(tert-phosphine)platinum, tris(tert - phosphine)palladium or a tetrakis(tert-phosphine)palladium compound, which compounds are prepared and described by L. Malatesta and M. Angoletta, J. Chem. Soc., 1957, 1186, and L. Malatesta and C. Cariello, J. Chem. Soc., 1958, 2323. In an alternate modification of the process, the catalyst is provided in the form of several components which can be considered forming the catalyst in situ. Employing palladium for purposes of illustration, the metal component is supplied as π-allyl complex of palladium. The simplest member of this class is π-allylpalladium salt, which, when the anion is chlorine, is represented by the following formula

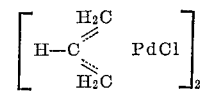

The preparation of this complex and related complexes is described by Huttel et al., Angew. Chemie, 71, 456

(1959). Other illustrative π-allyl complexes are represented by the formula

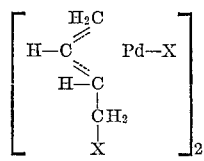

wherein X is halogen, which complexes are conveniently prepared by reaction of diene, e.g., butadiene or isoprene, with palladium halide in hydrocarbon media. It should be understood that analogous complexes of platinum are also suitable. Tertiary phosphine ligand is furnished by including as a second component any of the tertiary phosphines, e.g., triphenylphosphine, hereinabove described. The third component added can be considered a halogen removal agent and especially useful for this purpose are sodium borohydride, sodium formate, hydrazine and the like. Alternatively the first and second components may be combined in one, as exemplified by dichlorobis(triphenylphosphine)platinum, and introduced with one of the above-named halogen removal agents.

It is considered that in each above case the palladium or platinum compound is added as catalyst or catalyst precursor in the process of the invention. Largely for reasons of convenience, economy and speed of reaction, the preferred metal-containing catalyst is a palladium-containing one. A particularly preferred catalyst is the tetrakis(triphenylphosphine)palladium or that complex formed in situ from π-allylpalladium halide (chloride), triphenylphosphine and sodium borohydride.

The process of the invention is characterized by the requirement that the catalyst be employed essentially free of phenoxide anion. The process of the invention is characterized also by the requirement for only catalytic quantities of platinum or palladium compound. Although utilization of larger amounts of metal-containing catalyst is not detrimental to the process of the invention, amounts larger than about 1 mole percent based on total reactants are not generally required. Amounts of metal compound less than about 0.001 mole percent on the same basis are generally unsuitable because of the inevitable physical losses of catalyst during reaction and processing. In general, amounts of catalyst from about 0.01 mole percent to about 0.5 mole percent based on total reactants are satisfactory and are preferred.

An advantage of the catalysts of the invention is that during their use in the production of ethers or amines no metallic palladium or platinum is deposited, thereby enabling the more efficient use of portions of catalyst owing to the better maintenance of catalyst integrity during the process. When palladium or platinum halide is the catalyst modified with phenoxide anion catalyst promoter, as in the processes of U.S. 3,350,451, U.S. Ser. Nos. 681,029 and 663,559, there is a tendency for some metal to be deposited.

The process of the invention is typically conducted by charging the reactants and catalyst to an autoclave or similar reactor and maintaining the reaction mixture at reaction temperature until reaction is complete. The method of mixing is not critical although it is generally preferred to mix the reactants and add the catalyst thereto. The reaction is suitably conducted throughout a wide range of reaction temperatures and pressures, so long as the reactants are maintained substantially in the liquid phase. Reaction temperatures from about −20° C. to about 130° C. are satisfactory, although temperatures from about 0° C. to about 100° C. are preferred and best results are obtained when a temperature from about 30° C. to about 90° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants and catalyst, and are inert to the reactants and the products prepared therefrom. Exemplary solvents are normally liquid ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; normally liquid aromatic hydrocarbons such as benzene, toluene and xylene; N,N-dialkyl alkanoic acid amides and N-alkyl lactams, e.g., dimethylformamide, N,N-dimethylacetamide, N,N-diethylacetamide and N-methylpyrrolidinone; sulfoxides such as dimethyl sulfoxide; and nitriles such as acetonitrile and benzonitrile. The solvent, if any, is employed in a wide range of molar amount and from about ⅓ mole of solvent up to about 150 moles per mole of total reactants are satisfactory. For convenience, it is generally preferable to conduct the reaction in the absence of added solvent whenever the physical characteristics of the reaction mixture will allow.

Subsequent to reaction, the reaction mixture is separated and the desired product recovered by conventional means such as selective extraction, fractional distillation and chromatographic techniques.

The ether products of the invention are aryl alkadienyl ethers or aliphatic alkadienyl ethers illustratively produced by dimerization of the diene reactant and reaction of the diene dimer with the phenol or alcohol reactant to etherify at least one of the phenolic or alcoholic hydroxyl groups. The aryl alkadienyl ethers are described in the above-mentioned copending U.S. application Ser. No. 681,029, filed Nov. 6, 1967. The pertinent portions of Ser. No. 681,029 are incorporated in and made a part of this specification for the purpose of describing the aryl alkadienyl ether products in more detail. The aliphatic alkadienyl ethers are described in the above-mentioned copending U.S. application Ser. No. 663,559, filed Aug. 28, 1967. The pertinent portions of Ser. No. 663,559 are incorporated in and made a part of this specification for the purpose of describing the aliphatic alkadienyl ether products in more detail.

The ether products of the invention are useful in a variety of applications. The unsaturated linkages can be hydrated or hydroxylated to form useful alcohol derivative from which can be prepared esters or ethers. The ethylenic linkage serves as a dienophile in Diels-Alder condensations or as a reactive site for polymerization or copolymerization processes. The ether products may be hydrolyzed to form useful alkadienols, e.g., 2,7-octadienol, from which esters, sulfonates, sulfates and the like are prepared; for example, phthalic acid is esterified with 2,7-octadienol, to give di(2,7-octadienyl) phthalate, which is useful as a plasticizer for polyvinyl chloride and which upon polymerization yields a polyester resin. The ether products also may be treated with organic peracids for the conversion of the ethylenic linkages into epoxy groups as described in copending application of W. De Acetis et al. U.S. Ser. No. 456,001, filed May 14, 1965, now U.S. Pat. No. 3,432,465. For example, 1-(2,4-dichlorophenoxy)-2,7-octadiene is reacted with peracetic acid to obtain the monoepoxides of 1-(2,4 - dichlorophenoxy) - 2,7 - octadiene and/or the diepoxide; 1-(2,4 - dichlorophenoxy)-2,3-epoxy - 7 - octene, 1-(2,4 - dichlorophenoxy)-7,8-epoxy-2-octene, and 1-(2,4 - dichlorophenoxy) - 2,3,7,8-diepoxyoctane are each useful for the production therefrom of resin products. The unsaturated monoepoxides, 1-(2,4-dichlorophenoxy) - 2,3 - epoxy - 7 - octene and 1-(2,4-dichlorophenoxy)-7,8 - epoxy - 2 - octene, are first polymerized (polymerization of the ethylenic linkage) by heating with about 5% by weight of tert-butyl hydroperoxide or di(tert-butyl)-peroxide and then cured (polymerization of the epoxide groups) by heating with an epoxy curing agent, e.g., about 15% by weight of phthalic anhydride. The diepoxide, 1-(2,4 - dichlorophenoxy) - 2,3,7,8-diepoxyoctane, is cured by mixing a curing agent, e.g. about 12% by weight of diethylenetriamine, with the diepoxide and heating.

The amine products of the invention are N-(alkadienyl)amines illustratively produced by dimerization of the diene reactant and reaction of the diene dimer with the amine reactant to effect the N-alkadienylation, that is, to effect the introduction of the alkadienyl moiety as a nitrogen substituent, of at least one of the nontertiary amino nitrogen moieties. The N-(alkadienyl)amines are described in the above-mentioned U.S. 3,350,451. The pertinent portions of U.S. 3,350,451 are incorporated in and made a part of this specification for the purpose of describing the N-(alkadienyl)amine products in more detail.

The amine products of the invention are useful in a variety of applications. The tertiary amino moieties are oxidized to form tertamine-N-oxides, useful as detergents, or are reacted with alkyl halides to form quaternary ammonium salts, useful as germicides, surface-active agents and textile-treating agents; for example, N,N-dimethyl-2,7-octadienylamine is converted with dilute hydrogen peroxide solution to a tert-amine-N-oxide having surface-active properties and useful as a detergent. The secondary amino moieties are converted to corresponding 2-haloacetamides, useful as herbicidal compounds; for example, N-(2,7-octadienyl)methylamine is reacted with 2-chloroacetyl chloride to produce N-methyl-N-(2,7-actadienyl)-2-chloroacetamide having herbicidal properties and useful as a herbicide. Additionally the remaining unsaturated linkages can be hydrated or hydroxylated to form useful alcohol derivatives from which esters or ethers are prepared. The ethylenic linkage serves as a dienophile in Diels-Alder condensations and also as a reactive site in polymerization or copolymerization processes.

In the following examples, the relationship of volume to weight is the same relationship as that of milliliters to grams.

EXAMPLE 1

To a glass bomb tube were charged 3 parts by volume (0.074 mole) of methanol, 10 parts by volume (0.12 mole) of butadiene and 0.005 part by weight (0.000004 mole) of tetrakis(triphenylphosphine)palladium dissolved in 7 parts by volume of benzene. The bomb was sealed and maintained at 70° C. for 18 hours. The bomb was then cooled and the product mixture removed. Gas-liquid chromatographic (GLC) analysis of the product mixture indicated a conversion of 72.3% based on butadiene charged with a selectivity of 84% to 1-methoxy-2,7-octadiene and of 16% to 3-methoxy-2,7-octadiene.

Similar results were obtained where tetrakis(methyldiphenylphosphine)palladium was employed as catalyst in place of tetrakis(triphenylphosphine)palladium in the above reaction.

EXAMPLE 2

To a glass bomb tube were charged 1.2 parts by volume (0.03 mole) of methanol, 5 parts by volume (0.06 mole) of butadiene and 0.05 part by weight (0.00004 mole) of tetrakis(triphenylphosphine)platinum dissolved in 5 parts by volume of benzene. The bomb was sealed and maintained at 70 C. for 168 hours. The bomb was then cooled and the product mixture removed. GLC analysis of the product mixture indicated a conversion of 50% based on methanol charged with a selectivity of 65% to 1-methoxy-2,7-octadiene and of 35% to 3-methoxy-2,7-octadiene.

EXAMPLE 3

To a glass bomb tube were charged 3 parts by volume (0.074 mole) of methanol, 10 parts by volume (0.12 mole) of butadiene, 0.01 part by weight (0.00005 mole) of π-allylpalladium chloride, 0.042 part by weight (0.00016 mole) of triphenylphosphine and 0.006 part by weight (0.00015 mole) of sodium borohydride. The bomb was sealed and maintained at 30° C. for four hours. The bomb was then opened and the product mixture removed. GLC analysis of the product mixture indicated a conversion of 63.4% based on butadiene charged with a selectivity of 90% to 1-methoxy-2,7-octadiene and of 10% to 3-methoxy-2,7-octadiene.

EXAMPLE 4

To a glass bomb tube were charged 3 parts by volume (0.074 mole) of methanol, 10 parts by volume (0.12 mole) of butadiene, 0.05 part by weight (0.00007 mole) of dichlorobis(triphenylphosphine)palladium and 0.006 part by weight (0.00015 mole) of sodium borohydride. The bomb was sealed and maintained at 90° C. for 16 hours. The bomb was then cooled and the product mixture removed. GLC analysis of the product mixture indicated a conversion of 75% based on butadiene charged with a selectivity of 90% to 1-methoxy-2,7-octadiene and of 10% to 3-methoxy-2,7-octadiene.

EXAMPLE 5

To a stainless-steel bomb were charged 480 parts by volume (4.6 moles) of diethylamine, 1200 parts by volume (13.6 moles) of butadiene and 9 parts by weight (0.008 mole) of tetrakis(triphenylphosphine)palladium. The bomb was sealed and maintained at 70° C. for 40 hours. The bomb was then cooled and the product mixture removed. GLC analysis of the product mixture indicated a conversion of 60% based on diethylamine charged, with a selectivity of 95% to N,N-diethyl-2,7-octadienylamine.

EXAMPLE 6

To a glass bomb tube were charged 1.9 parts by weight (0.02 mole) of phenol, 5 parts by volume (0.06 mole) of butadiene and 0.012 part by weight (0.00001 mole) of tetrakis(triphenylphosphine)palladium dissolved in 5 parts by volume of toluene. The bomb was sealed and maintained at 70° C. for 18 hours. The bomb was then cooled and the product mixture removed. GLC analysis of the product mixture indicated a conversion of 82% based on phenol charged with a selectivity of 90% to 1-phenoxy-2,7-octadiene and of 10% to 3-phenoxy-2,7-octadiene.

For purposes of comparison the above experiment was repeated with 0.00001 mole of palladium chloride (PdCl$_2$) substituted for tetrakis(triphenylphosphine)palladium; a conversion of <0.1% was obtained. Another run with 0.00001 mole of π-allypalladium chloride (π-C$_3$H$_5$PdCl) substituted for tetrakis(triphenylphosphine)palladium resulted in a conversion of <0.1%.

EXAMPLE 7

To a glass bomb tube were charged 1.9 parts by weight (0.02 mole) of phenol, 5 parts by volume (0.06 mole) of butadiene, 0.002 part by weight (0.00001 mole) of π-allylpalladium chloride, 0.008 part by weight (0.00003 mole) of triphenylphosphine and 0.002 part by weight (0.00005 mole) of sodium borohydride. The bomb was sealed and maintained at 70° C. for 18 hours. The bomb was then cooled and the product mixture removed. GLC analysis of the product mixture indicated a conversion of 100% based on phenol charged with a selectivity of 90% to 1-phenoxy-2,7-octadiene and of 10% to 3-phenoxy-2,7-octadiene.

EXAMPLE 8

To a glass bomb tube were charged 3.5 parts by volume (0.04 mole) of 2,2,2-trifluoroethanol, 10 parts by volume (0.12 mole) of butadiene and 0.01 part by weight (0.000008 mole) of tetrakis(triphenylphosphine)palladium. The bomb was sealed and maintained at 70° C. for 48 hours. The bomb was then opened and the unreacted butadiene bubbled off. The remainder of the reaction mixture was distilled at reduced pressure yielding a 73% conversion based on 2,2,2-trifluoroethanol charged with a selectivity of 90% to 1-(2,2,2-trifluoroethoxy)-2,7-octadiene, B.P. 55° C. at 3 mm. Hg.

EXAMPLE 9

To a glass bomb tube were charged 5 parts by volume (0.06 mole) of morpholine, 10 parts by volume (0.12 mole) of butadiene, 0.025 part by weight (0.0013 mole) of π-allylpalladium chloride, 0.048 part by weight (0.0002 mole) of triphenylphosphine and 0.003 part by weight (0.00008 mole) of sodium borohydride. The bomb was sealed and maintained at 70° C. for 24 hours. The bomb was then opened and the unreacted butadiene bubbled off. The remainder of the reaction mixture was distilled at reduced pressure yielding an 89% conversion based on morpholine charged with a selectivity of 95% to N-(2,7-octadienyl)morpholine, B.P. 66–69° C. at 2 mm. Hg.

EXAMPLE 10

To a glass bomb tube were charged 3.1 parts by weight (0.033 mole) of phenol, 10.7 parts by weight (0.2 mole) of butadiene and 0.1 part by weight (0.00011 mole) of tris(triphenylphosphine)palladium. The bomb was sealed and maintained at 55° C. for 19 hours. The bomb was then cooled and the product mixture removed. GLC analysis of the product mixture indicated a conversion of 84% based on phenol charged with a selectivity of >90% to 1-phenoxy-2,7-octadiene.

EXAMPLE 11

To a glass bomb-tube were charged 4 parts by weight (0.124 mole) of methanol, 10 parts by weight (0.15 mole) of isoprene and 0.1 part by weight (0.00011 mole) of tris(triphenylphosphine)palladium. The bomb was sealed and maintained at 54° C. for 24 hours. The bomb was then cooled and the product mixture removed. GLC analysis of the product mixture indicated a conversion of 97% based on isoprene charged with a selectivity of 58% to 1-methoxy-2,6-dimethyl-2,7-octadiene and of 25% to 1-methoxy-2,7-dimethyl-2,7-octadiene.

I claim as my invention:

1. The process of producing N-(alkadienyl)amine by reacting an alkyl primary or secondary monoamine of up to 20 carbon atoms with a vicinal dimethylidenealkane conjugated diene of from 4 to 6 carbon atoms at a temperature from about −20° to about 130° C. in the presence of, as catalyst, palladium or platinum complexed with $R_3P$, wherein R independently is a hydrocarbyl group of from 1 to 10 carbon atoms with only aromatic unsaturation and is attached to the phosphorus atom by a carbon-phosphorus bond, and essentially free of phenoxide anion.

2. The process according to claim 1 wherein the amount of conjugated diene present for reaction is from about 0.1 to about 10 moles per mole of said monoamine reactant.

3. The process according to claim 2 wherein said monoamine reactant is one of up to 12 carbon atoms.

4. The process according to claim 3 wherein the N-(alkadienyl)-amine produced is N-(2,7-octadienyl) amine, the conjugated diene is butadiene, the palladium or platinum complex is present in from about 0.001 mole percent to about 1 mole percent based on total reactants, and the process is conducted at a temperature from about 0° C. to about 100° C.

5. The process according to claim 4 wherein the N-(2,7-octadienyl)amine product is N,N-diethyl-2,7-octadienylamine, the monoamine reactant is diethylamine, the catalyst complex is tetrakis(triphenylphosphine)-palladium and the process is conducted at a temperature from about 30° to about 90° C.

6. The process according to claim 1 wherein the palladium or platinum complex is produced in situ from the interaction of π-allylpalladium or π-allylplatinum halide, $R_3P$ and sodium borohydride.

7. The process according to claim 6 wherein $R_3P$ is triphenylphosphine.

References Cited

UNITED STATES PATENTS 3,350,451  10/1967  Smutny.
3,358,016  12/1967  Kohll et al.
3,444,202  5/1969  Chung et al.

CHARLES B. PARKER, Primary Examiner

R. L. RAYMOND, Assistant Examiner

U.S. Cl. X.R.

252—430; 260—247, 293, 585, 612, 614